(12) United States Patent
Driscoll

(10) Patent No.: US 11,707,018 B2
(45) Date of Patent: Jul. 25, 2023

(54) ADJUSTABLE HANDLE ASSEMBLY FOR A WALK-BEHIND MOWER

(71) Applicant: MTD PRODUCTS INC, Valley City, OH (US)

(72) Inventor: Mark Driscoll, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 17/829,409

(22) Filed: Jun. 1, 2022

(65) Prior Publication Data

US 2022/0287228 A1 Sep. 15, 2022

Related U.S. Application Data

(63) Continuation of application No. PCT/US2020/062814, filed on Dec. 2, 2020.

(60) Provisional application No. 62/942,250, filed on Dec. 2, 2019.

(51) Int. Cl.
| | |
|---|---|
| *A01D 34/00* | (2006.01) |
| *A01D 101/00* | (2006.01) |
| *B24B 23/02* | (2006.01) |
| *B24B 23/00* | (2006.01) |
| *B25F 5/02* | (2006.01) |
| *B62B 5/06* | (2006.01) |

(52) U.S. Cl.
CPC ........ *A01D 34/001* (2013.01); *A01D 2101/00* (2013.01); *B24B 23/005* (2013.01); *B24B 23/02* (2013.01); *B25F 5/026* (2013.01); *B62B 5/06* (2013.01)

(58) Field of Classification Search
CPC .. A01D 34/001; A01D 2101/00; A01D 34/68; A01D 34/824; F16C 2310/00; B62B 5/06; B25F 5/206; B24B 23/02; B24B 23/005
See application file for complete search history.

(56) References Cited

U.S. PATENT DOCUMENTS

| | | | | |
|---|---|---|---|---|
| D374,017 | S  * | 9/1996 | Chunn | D15/14 |
| 5,765,857 | A  * | 6/1998 | Hsiao | B62B 1/042 |
| | | | | 280/DIG. 8 |
| 6,499,172 | B1 * | 12/2002 | McCracken | B24B 23/005 |
| | | | | 15/97.1 |

(Continued)

FOREIGN PATENT DOCUMENTS

| | | |
|---|---|---|
| CN | 207252233 U | 4/2018 |
| DE | 2648349 A1 | 2/1978 |

(Continued)

OTHER PUBLICATIONS

International Search Report and Written Opinion for Application No. PCT/US20/062814 dated Mar. 17, 2021, 11 pgs.

*Primary Examiner* — Arpad F Kovacs
(74) *Attorney, Agent, or Firm* — Wegman Hessler Valore

(57) ABSTRACT

A handle adjustment assembly is attached to a walk-behind lawn mower, wherein the handle adjustment assembly is rotatably adjustable relative to a deck of the mower to allow the handle to be adjusted to multiple different heights relative to the ground at distinct operative positions. The handle adjustment assembly is also rotatable to allow the handle to be adjusted to a stored position adjacent to the deck, wherein the mower can be stored in a substantially vertical orientation.

2 Claims, 14 Drawing Sheets

(56) References Cited

U.S. PATENT DOCUMENTS

| | | | |
|---|---|---|---|
| 8,209,816 B2 * | 7/2012 | Heger | B60R 1/06 |
| | | | 16/334 |
| 8,984,718 B2 * | 3/2015 | Ejdehag | A01D 34/68 |
| | | | 16/436 |
| 2006/0053762 A1 * | 3/2006 | Stover | A01D 34/67 |
| | | | 56/16.7 |
| 2008/0078156 A1 * | 4/2008 | Qiao | A01D 34/824 |
| | | | 56/16.7 |
| 2011/0302893 A1 | 12/2011 | Park | |
| 2013/0125344 A1 * | 5/2013 | Courbon | E05D 11/1078 |
| | | | 16/342 |
| 2014/0112702 A1 * | 4/2014 | Mighells | B25F 5/02 |
| | | | 403/92 |

FOREIGN PATENT DOCUMENTS

| | | | | |
|---|---|---|---|---|
| DE | 202013005819 U1 * | 8/2013 | | A01D 34/62 |
| EP | 1902608 A2 * | 3/2008 | | A01D 34/824 |
| EP | 2476303 A1 * | 7/2012 | | A01D 34/824 |
| EP | 3498073 B1 * | 2/2021 | | A01D 34/824 |
| GB | 2481106 A * | 12/2011 | | A01D 34/00 |
| GB | 2481107 A * | 12/2011 | | A01D 34/00 |
| GB | 2481109 A * | 12/2011 | | A01D 34/00 |
| WO | WO-2013066223 A1 * | 5/2013 | | A01B 76/00 |

\* cited by examiner

ADJUSTABLE HANDLE ASSEMBLY FOR A WALK-BEHIND MOWER

CROSS-REFERENCE TO RELATED APPLICATIONS

This application is a continuation of, and claims the priority filing benefit of International PCT Application PCT/US2020/62814 filed Dec. 2, 2020, and U.S. Provisional Patent Application Ser. No. 62/942,250 filed Dec. 2, 2019, which are herein incorporated by reference in their entireties.

FIELD OF THE INVENTION

The present invention relates to outdoor lawn maintenance equipment, and more particularly, to walk-behind lawn mowers.

BACKGROUND OF THE INVENTION

Walk-behind lawn mowers are used to cut grass and other vegetation in the course of landscaping lawns. Typical walk-behind mowers include a stamped metal deck having a U-shaped metal handle extending rearwardly therefrom, wherein an operator controls the direction and movement of the walk-behind mower using the handle. The handle is usually attached to the deck with a locking mechanism such as a nut-and-bolt, wingnut-and-bold, or other semi-permanent mechanism which provides only a single operative position of the handle relative to the deck.

BRIEF SUMMARY OF THE INVENTION

In one aspect of the present invention, a handle adjustment assembly of a walk-behind lawn mower for selectively adjusting an orientation of a handle of the mower is provided. The mower includes a deck, a plurality of ground engaging members connected to the deck, and a power supply connected to the deck for driving a cutting system. The handle adjustment assembly includes a pair of indexing mechanisms attached to the deck or to a support member. Each of the indexing mechanisms includes a first indexing member attached to the deck or to a support member connected to the deck. The first indexing member includes a plurality of annularly positioned first teeth. A first indexing gap is located within the plurality of first teeth of the first indexing member. The handle adjustment assembly also includes a seconding indexing member selectively engageable with the first indexing member. The second indexing member includes a plurality of annularly positioned second teeth. A first indexing lug is located within the plurality of second teeth of the second indexing member. The handle adjustment assembly further includes a clasp assembly connected to the first and second indexing members. A clasp assembly is actuatable between a locked position and an unlocked position. The handle adjustment assembly also includes a handle having a pair of opposing legs connected by a cross-bar. Each of the legs has an end, and each end is attached to one of the indexing members of the adjustable handle assembly. The clasp of each indexing mechanism is actuatable between a locked position in which the second indexing member is engaged with the first indexing member in which the indexing lug is located within the first indexing gap and the first teeth being in meshing engagement with the second teeth and an unlocked position in which the second indexing member is disengage from the first indexing member. The second indexing member is rotatable relative to the first indexing member to selectively adjust the indexing lug to one of a plurality of operative positions provided by the first indexing member. The height of the handle relative to the ground is adjusted in response to the first indexing members being rotatably adjusted relative to the second indexing members to provide a plurality of operative positions of the handle.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
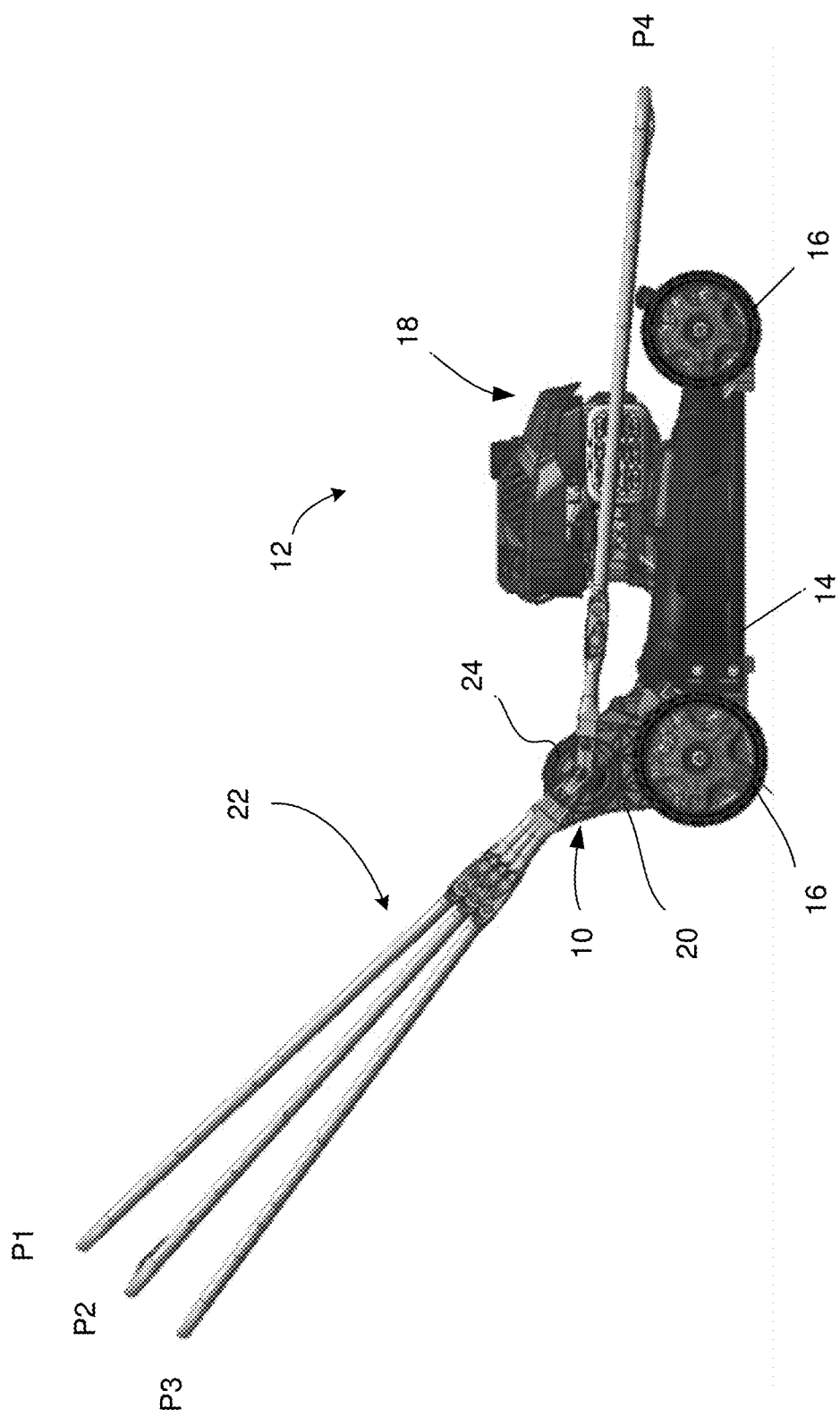
FIG. 1 is an exemplary embodiment of a walk-behind mower having a handle adjustment assembly with the handle shown in multiple operative positions and a stored position.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2:
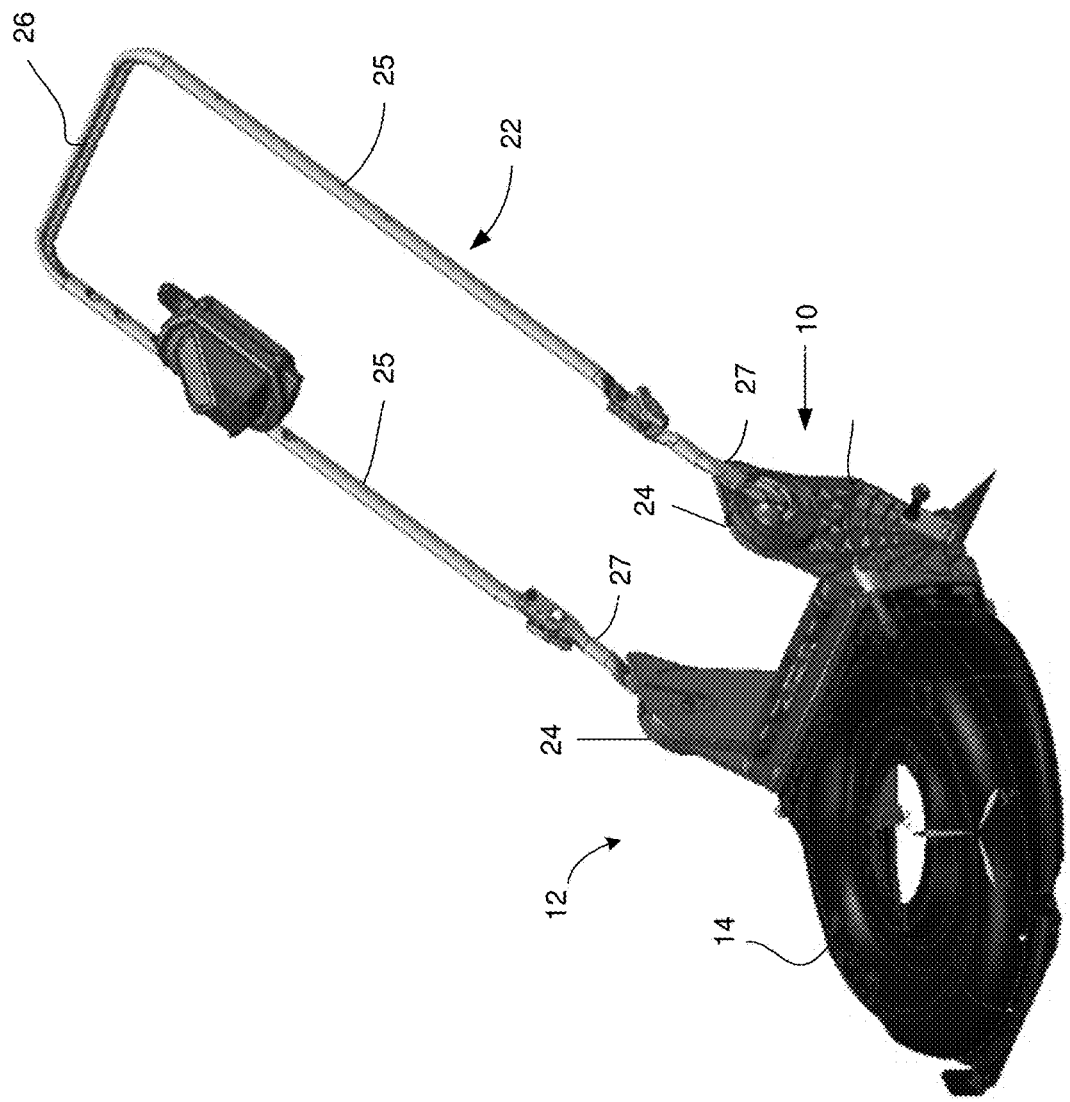
FIG. 2 is an isometric view of a walk-behind mower having the handle adjustment assembly.

Referring to FIGS. 1-2, an exemplary embodiment of a walk-behind lawn mower 12 having a handle adjustment assembly 10 is shown. The walk-behind lawn mower 12 includes a deck 14, a plurality of ground engaging members 16, a power supply 18, at least one cutting blade or cutting system (not shown) connected to the power supply 18 by a drive shaft, a support member 20 extending rearwardly from the deck 14, and a handle adjustment assembly 10 connecting a handle 22 to the support member 20 or the deck 14. The ground engaging members 16 are rotatably attached to the deck 14. The ground engaging members 16 are formed as wheels or tires such as pneumatic tires, plastic wheels, non-pneumatic tires, or the like. In some embodiments, at least one of the ground engaging members 16 is selectively driven by a transmission (not shown). The power supply 18 is attached to the upper surface of the deck 14. In an embodiment, the power supply 18 is formed as an internal combustion engine, an electric motor, a hybrid motor, or a plurality of motors configured to control various systems of the mower 12 including, but not limited to, the cutting system, the ground engaging transmission(s) or other systems.

Any reference below to the "fore," "forward," or "front" is the longitudinal direction the mower 12 is pushed when an operator is exerting forward force on the handle 22. In addition, reference to "aft," "rear," or "rearward" is the longitudinal direction opposite the fore/forward direction, or the direction of the mower 12 moves when an operator pulls on the handle 22. Further, reference to the "left side" is the left lateral side of the mower 12 when the operator is in the operating position looking forward toward the deck 14, and reference to the "right side" is the right lateral side of the mower opposite the left side. when looking at the deck 14 from an operating position (behind the deck 14, adjacent to the handle 22).

In general, the handle of a lawn mower is configured to allow an operator to control the direction and movement of the walk-behind lawn mower. Typical walk-behind lawn mowers include a handle extending from a deck at a fixed, or single operative position for use by all operators. The problem is that the single fixed operative position does not provide a comfortable operating position for users of all heights. The handle adjustment assembly 10 shown in FIGS. 1-2 solves this problem by allowing a user to selectively adjust the height of the handle 22 relative to the ground in order to position the handle 22 at a comfortable operating height for each operator. The handle adjustment assembly 10 further allows an operator to rotate the handle 22 to a stored position in which the lawn mower 12 can be stored in a vertical orientation without interference from the handle 22.

Figure 3:
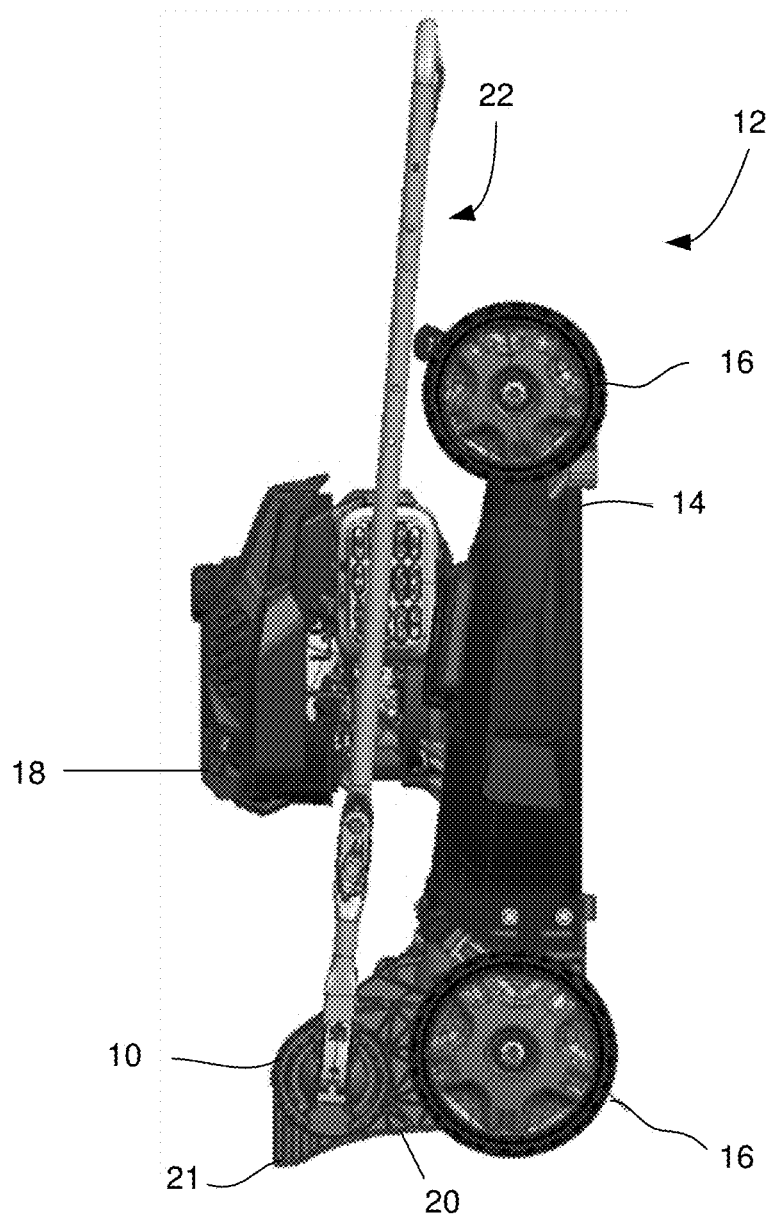
FIG. 3 is a side view of the walk-behind mower with the handle in a stored position.

In the embodiment illustrated in FIGS. 1-2, the deck 14 is a generally round member having a squared rear end and also having a central aperture through which a drive shaft extends downwardly from the power supply 18. The drive shaft is selectively rotatable to drive the cutting blade or cutting system (not shown). In the illustrated embodiment, the support member 20 is attached to the rear end of the deck 14 and extends generally rearwardly therefrom. In an embodiment, the support member 20 is formed as a unitary member. In another embodiment, the support member 20 is formed of a plurality of members attached to the rear end of the deck 14. The support member 20 is configured to provide a base upon which the lawn mower 12 rests when oriented in a vertical or stored position, as shown in FIG. 3. The support member 20 includes a pair of feet 21, wherein the feet 21 are configured to contact the ground to stabilize the mower 12 when the mower 12 is oriented in a vertical position.

In the illustrated embodiment, the handle 22 of the handle adjustment assembly 10 is attached to the support member 20 by way of a pair of indexing members 24, as shown in FIGS. 1-3. In another embodiment, the handle 22 of the handle adjustment assembly 10 is attached directly to the deck 14 by way of a pair of indexing members 24. The handle 22 is rotatable relative to the deck 14 to adjust the height of the handle 22 relative to the ground. As shown in FIG. 1, the handle 22 is adjustable between three (3) operative positions $P_1$, $P_2$, $P_3$ and one (1) stored position $P_4$. It should be understood by one having ordinary skill in the art that the handle adjustment assembly 10 is configured to provide the handle 22 with two or more operative positions as well as with or without a stored position. In an embodiment, the handle adjustment assembly 10 includes the handle 22, a first indexing member 32, a second indexing member 34, and a clasp assembly 36.

In an exemplary embodiment, the handle 22 is formed as a generally elongated U-shaped member. In other embodiments, the handle 22 is formed as a T-bar. It should be understood by one having ordinary skill in the art that the handle 22 can be formed of any shape or of any number of components sufficient to allow an operator to grasp the handle 22 and push/pull as well as steer the direction of movement of the mower 12. In the illustrated embodiment, the U-shaped handle 22 includes a pair of substantially parallel legs 25 and a cross-bar 26 extending between and connecting the legs 25. Each of the legs 25 includes an end 27 that is attachable to the handle adjustment assembly 10. The ends 27 of the handle 22 are compressed or flattened out in order to provide a substantially flat portion for ease of attachment to the handle adjustment assembly 10. When the handle 22 is assembled, the legs 25 are oriented just slightly off of parallel in which each of the legs 25 extends from the cross-bar 26 in a laterally outward direction. As such, when the end 27 of each leg 25 is attached to the handle adjustment assembly 10, the alignment of the legs 25 in a substantially parallel orientation creates a laterally outward biasing force at each of the ends 27. This lateral biasing force of the legs 25 of the handle 22 acts to bias each of the indexing mechanisms 24 toward a disengaged position.

Figure 4:
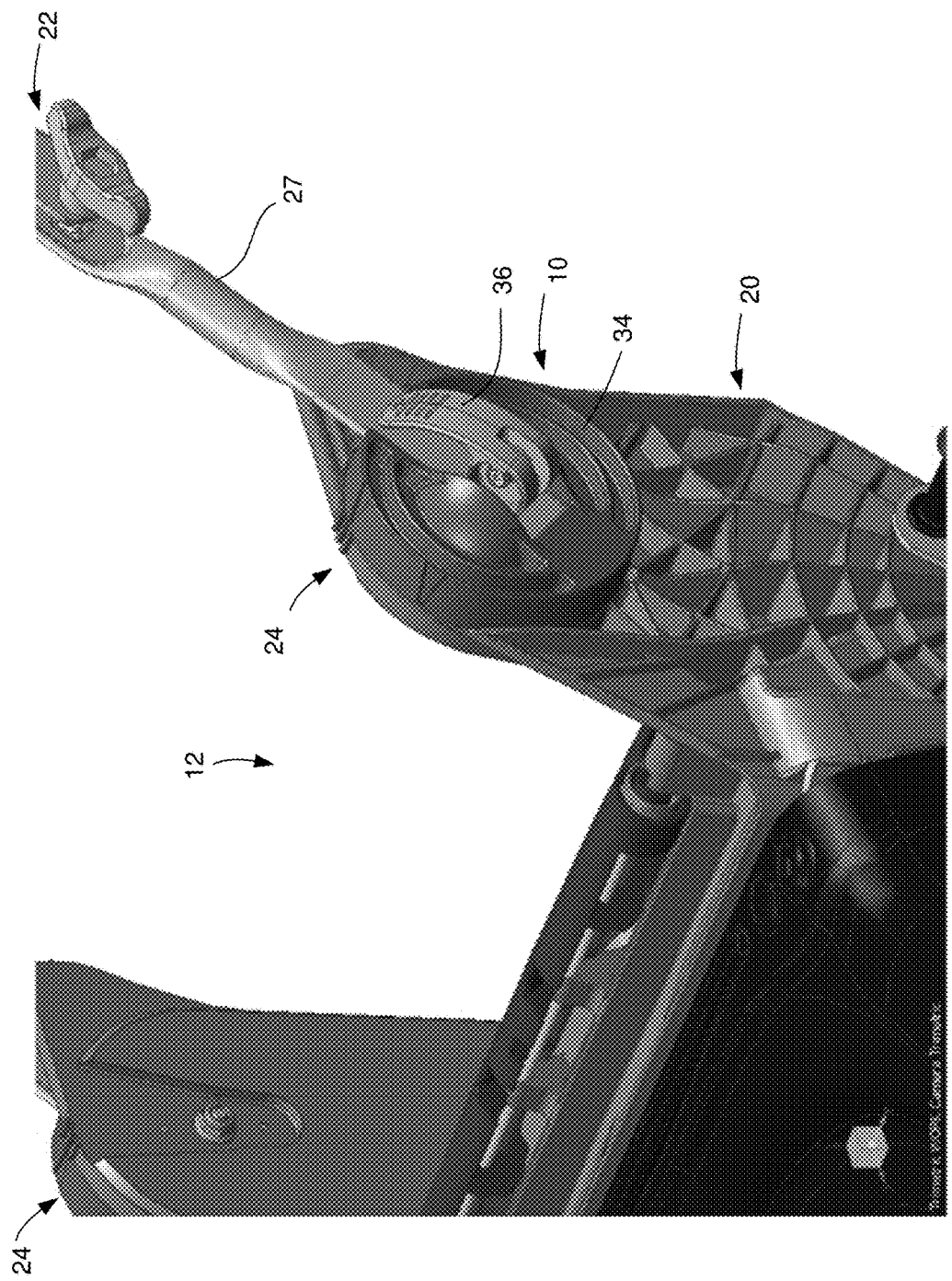
FIG. 4 is a magnified view of an embodiment of the handle adjustment assembly attached to a support member.
Figure 5:
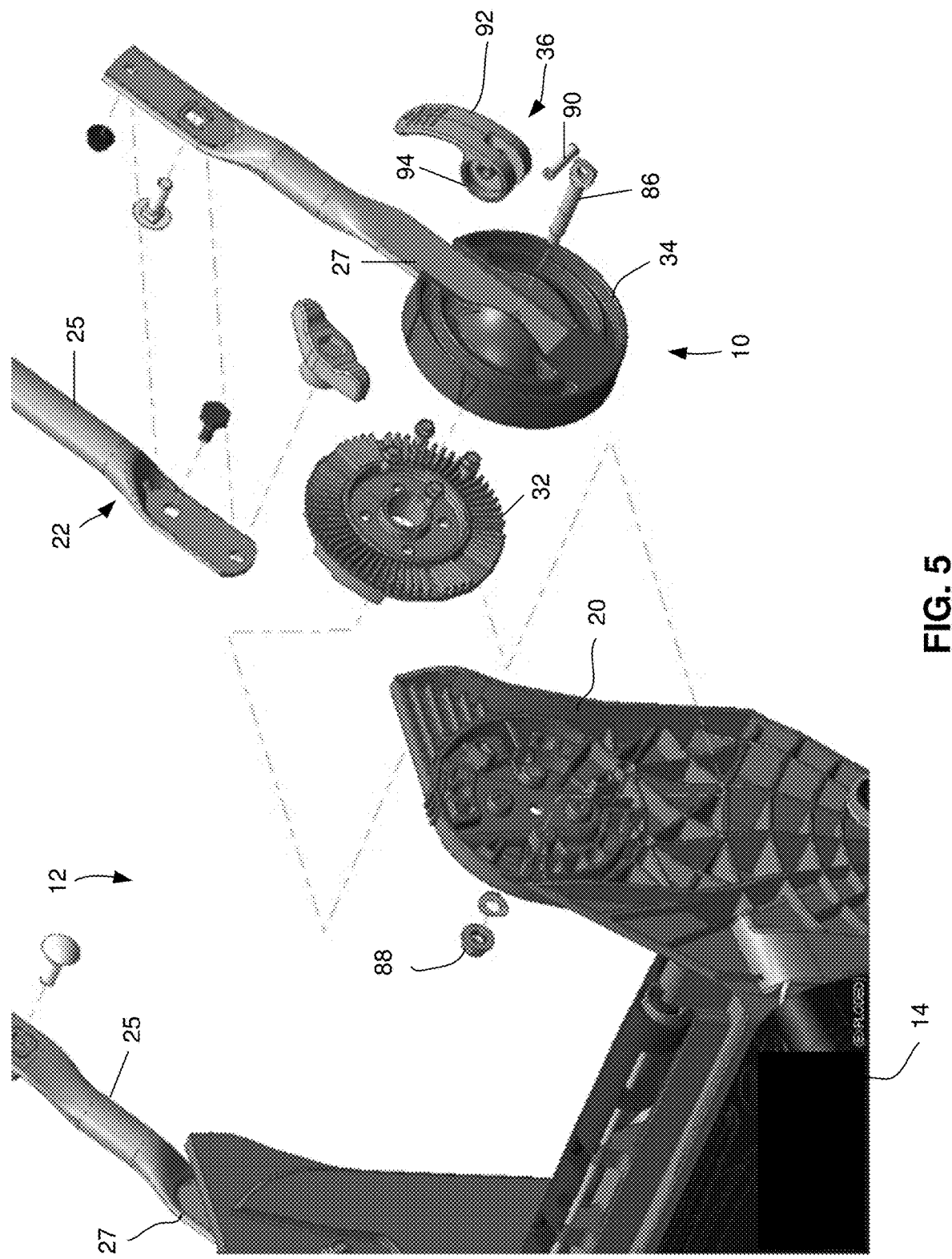
FIG. 5 is an exploded view of the handle adjustment assembly shown in FIG. 4.

The handle adjustment assembly 10 is configured to allow the handle 22 to be selectively rotatable to a plurality of positions relative to the deck 14. In an embodiment, the handle adjustment assembly 10 is attached to the support member 20 and connects the handle 22 to the support member 20, as shown in FIGS. 4-5. In other embodiments (not shown), the handle adjustment assembly 10 is attached directly to the deck 14 without the intermediate support member 20. Each of the indexing mechanisms 24 is configured to independently adjust the orientation of the end 27 of one leg 25 of the handle 22 separate from the adjustment of the end 27 of the other leg 25 of the handle 22. In other words, each of the indexing mechanisms 24 of the handle adjustment mechanism 10 is operated or actuated separately from the other to adjust the angle or position of the handle 22.

In an embodiment, each indexing mechanisms 24 includes a first indexing member 32, a second indexing member 34, and a clasp assembly 36 configured to positively secure the first and second indexing members 32, 34 in meshing engagement. As shown in FIGS. 4-5, each of the first indexing members 32 is attached to an opposing lateral side of the support member 20, wherein the first indexing members 32 are spaced apart and attached to opposite sides of the support member 20. The opposing first indexing members 32 are directed laterally outward, away from the deck 14. Each of the second indexing members 34 is positioned adjacent to one of the first indexing members 32 for selective engagement therebetween. The clasp assembly 36 of the indexing mechanism 24 is configured to selectively engage and disengage the second indexing members 34 relative to the first indexing members 32 to positively secure the handle 22 in one of the plurality of operative positions or the stored position. The following describes the components and interaction/adjustment of one of the indexing mechanisms 24, but it should be understood by one skilled in the art that the following description applies to both of the indexing mechanisms 24 but in a mirror configuration.

Figure 6A:
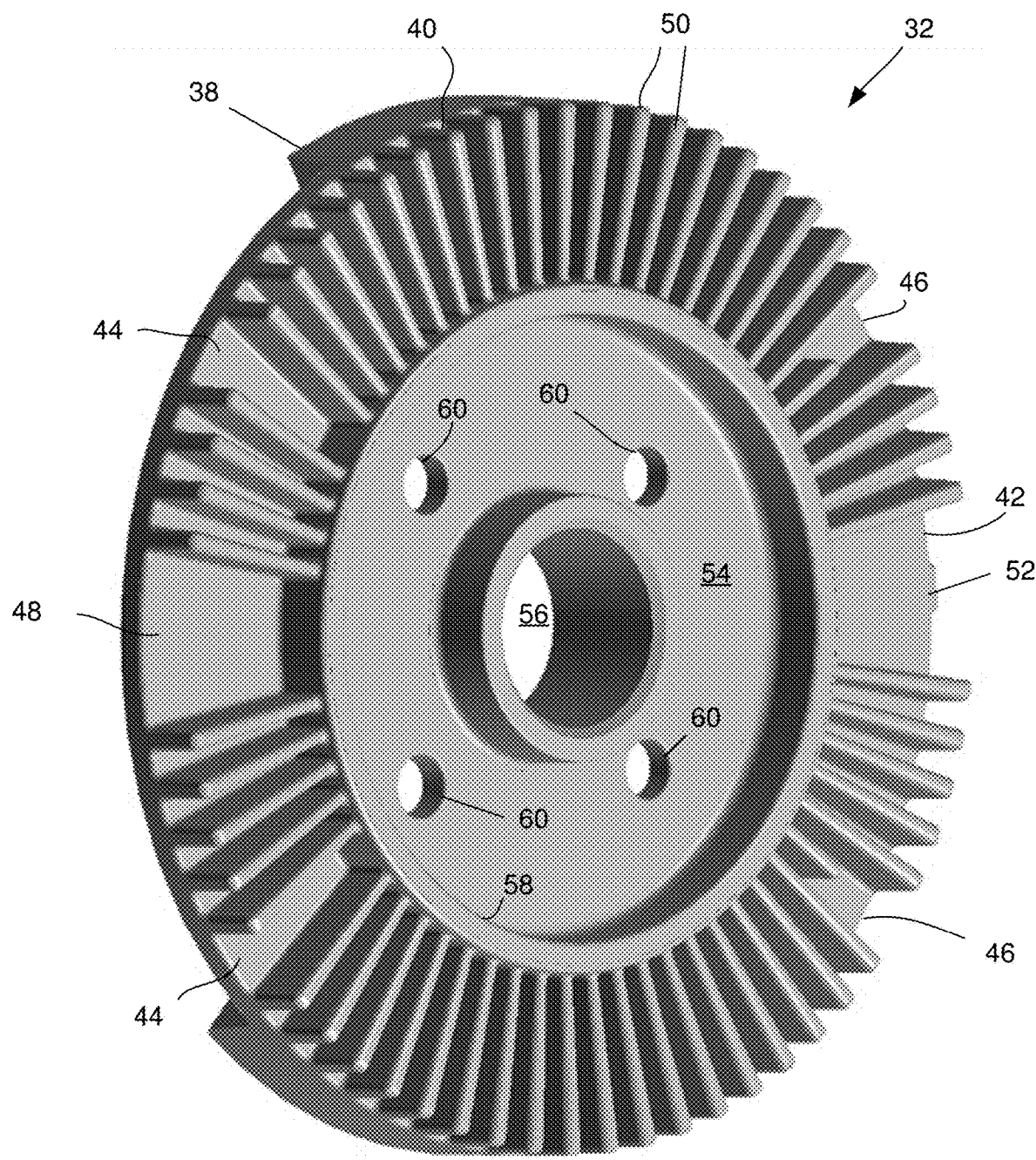
FIG. 6A is an isometric view of a first indexing member.
Figure 6B:
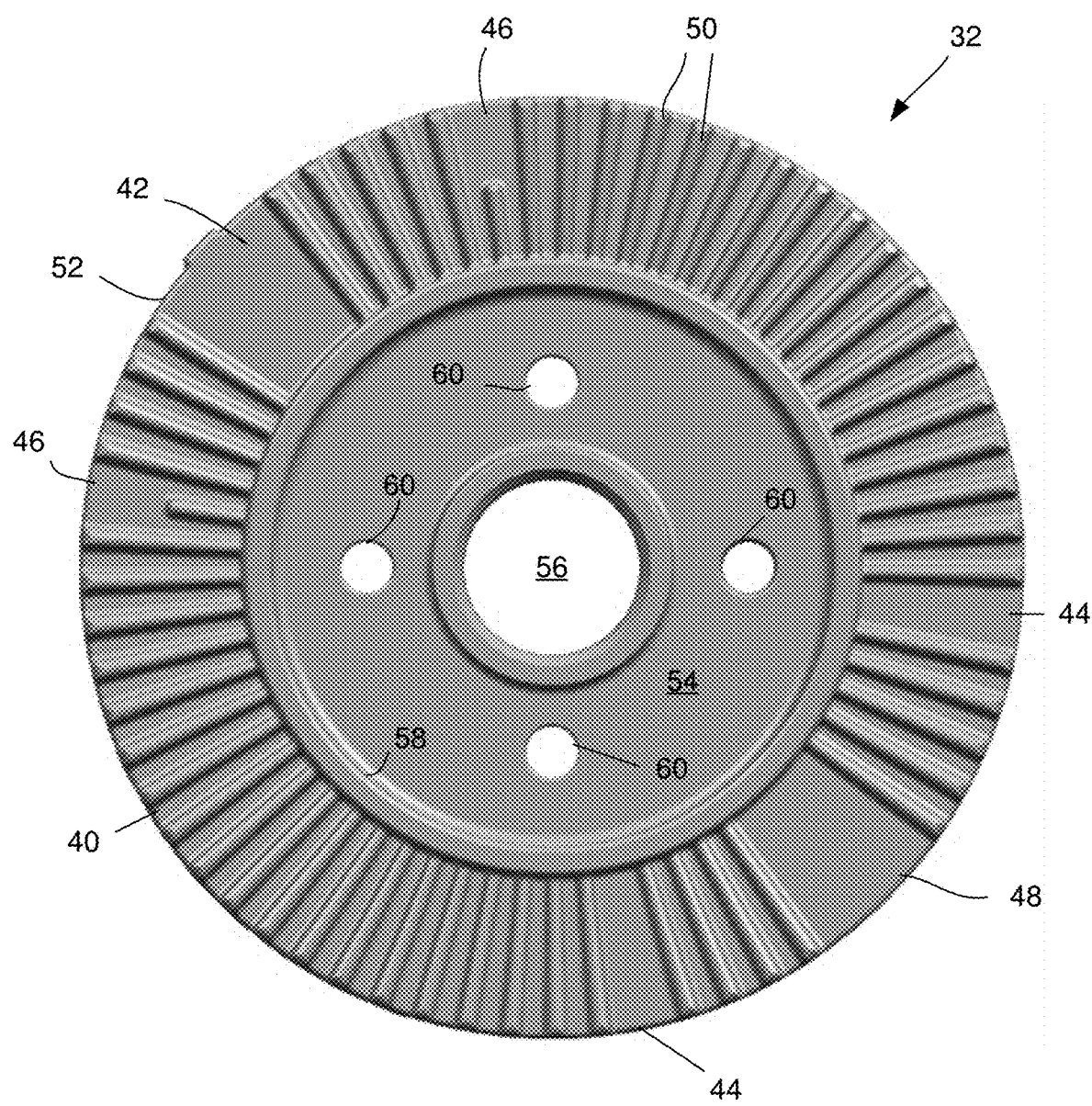
FIG. 6B is a front view of the first indexing member shown in FIG. 6A.

In the exemplary embodiment shown in FIGS. 6A-6B, the first indexing member 32 of an indexing mechanism 24 is a generally circular or disk-shaped member. The first indexing member 32 includes a mounting surface 38 and an opposing engaging surface 40. The mounting surface 38 of the first indexing member 32 is configured to be positioned immediately adjacent to, or abutting, the support member 20 or the deck 14 to which the first indexing member 32 is attached. The engaging surface 40 of the first indexing member 32 is directed away from the support member 20 or deck 14, wherein the engaging surface 40 is directed toward the corresponding second indexing member 34. The engaging surface 40 is directed laterally away from the mower 12.

In an embodiment, the first indexing member 32 includes only a first indexing gap 42. In other embodiments, the first indexing member 32 includes both a first indexing gap 42 and a second indexing gap 44, as shown in FIGS. 6A-6B. In the illustrated embodiment, the first indexing gap 42 is larger than the second indexing gap 44. The first indexing gap 42 is configured to provide the handle adjustment assembly 10 a plurality of operating positions which, in turn, provides the handle 22 with multiple operating positions (P1-P3) for users of different heights. When the handle 22 is in one of the plurality of operating positions, the handle 22 is oriented at a different angle relative to the deck 14 in each of the indexing positions of the handle adjustment assembly 10 to provide different operating heights of the handle 22 for the user. The second indexing gap 44 is angularly spaced apart from the first indexing gap 42. The second indexing gap 44 is configured to provide a stored indexing position for the handle 22, wherein the handle 22 is oriented in a stored operative position relative to the deck 14. When the handle 22 is in the stored operative position, the handle 22 is oriented adjacent to the deck 14.

In an embodiment, the first indexing member 32 includes a hub 54, a central aperture 56, a ridge 58, and a plurality of attachment apertures 60, as shown in FIGS. 6A-6B. The hub 54 is centrally located and is formed as a generally flat central portion of the first indexing member 32. The central aperture 56 is formed through the center of the hub 54. The central aperture 56 receives a portion of the clasp assembly 36 for selectively interconnecting the first indexing member 32 to the second indexing member 34. The attachment apertures 60 are formed through the hub 54 and positioned about the central aperture 56. The attachment apertures 60 are configured to receive attachment mechanisms for attaching the first indexing member 32 to the support member 20 or the deck 14. The ridge 58 is formed as a circular raised rib, wherein the ridge 58 extends concentrically about the central aperture 56. The ridge 58 is positioned radially outward from the attachment apertures 60 and radially inward from the outer edge 52 of the engaging surface 40. The ridge 58 extends axially away from the engaging surface 40 to provide a raised boundary between the hub 54 and a plurality of teeth 50.

In the illustrated embodiment, the first indexing member 32 also includes a plurality of teeth 50 extending axially away from engaging surface 40, as shown in FIGS. 6A-6B. The teeth 50 are annularly positioned adjacent to the outer edge of the engaging surface 40. In the illustrated embodiment, the teeth 50 extend radially outward between the ridge 58 to the outer edge 52 of the engaging surface 40. In other embodiments, the first indexing member 32 does not include a ridge 58, whereby the teeth 50 extend radially a portion of the distance between the central aperture 56 and the outer edge 52 of the engaging surface 40. It should be understood by one skilled in the art that the teeth 50 can also be radially aligned without extending from a circular ridge 58. In other embodiments, at least one of the teeth 50 extends in a radial direction from the ridge 58 but does not extend to the outer edge 52 of the engaging surface 40. The teeth 50 are evenly spaced about the engaging surface 40. The teeth 50 are configured to provide a meshing engagement with corresponding teeth of the second indexing member 34. The teeth 50 are separated by recesses that are sized and shaped to receive corresponding teeth of the second indexing member 34. The gaps 42, 44, 46, 48 are formed by an absence between adjacent teeth 50.

The embodiment of the first indexing member 32 shown in FIGS. 6A-6B includes a single first indexing gap 42, a pair of second indexing gaps 44, a pair of third indexing gaps 46, and a fourth indexing gap 48. Each of the gaps 42, 44, 46, 48 are located within the annularly positioned teeth 50. The first indexing gap 42 is positioned near the top of the first indexing member 32 whether the first indexing member 32 is attached to the left or right support member 20 or side of the deck 14. The first indexing gap 42 is configured to receive the indexing lug 82 (FIG. 7A) of the second indexing member 34 to provide a plurality of operative positions of the handle 22. In the illustrated embodiment, the first indexing gap 42 is configured to provide three (3) operative positions for the handle 22. The fourth indexing gap 48 is located opposite the first indexing gap 42, wherein the fourth indexing gap 48 is positioned near the bottom of the first indexing member 32 when the first indexing member is attached to the left or right support member 20 or side of the deck 14. Although the fourth indexing gap 48 is not a necessary gap formed on the first indexing member 32, in the embodiments of the first indexing member 32 that include the fourth indexing gap 48, the fourth indexing gap 48 receives the secondary lug 84 (FIG. 7A) of the second indexing member 34 to cooperate with the indexing lug 82 in positively positioning the handle 22 in one of multiple operative positions. The fourth indexing gap 48 assists in distributing the rotational or torsional forces between the first and second indexing members 32, 34 during operation as a result of the operator pushing, twisting, or otherwise maneuvering the handle 22 relative to the deck 14.

The second indexing gaps 44 of the first indexing member 32 are configured to receive the indexing lug 82 (FIG. 7A) of the second indexing member 34 to provide a stored position of the handle 22. In the embodiment of the first indexing member 32 shown in FIGS. 6A-6B, when the first indexing member 32 is attached to the left support member 20 or the left side of the deck 14, the second indexing gap 44 that is counter-clockwise relative to the first indexing gap 42 is configured to receive the indexing lug 82 of the second indexing member 34 to position the handle 22 in the stored position. Simultaneously, the third indexing gap 46 positioned clockwise relative to the first indexing gap 42 is configured to receive the secondary lug 84 when the handle 22 is in the stored position. When the first indexing member 32 is attached to the right support member 20 or the right side of the deck 14, the second indexing gap 44 that is clockwise relative to the first indexing gap 42 is configured to receive the indexing lug 82 of the second indexing member 34 to position the handle 22 in the stored position. Simultaneously, the third indexing gap 46 positioned counter-clockwise relative to the first indexing gap 42 is configured to receive the secondary lug 84 when the handle 22 is in the stored position.

The illustrated embodiment of the first indexing member 32, shown in FIGS. 6A-6B, is configured to be attached to both the left and right sides of the support member 20 or the deck 14, thereby necessitating both the first and third indexing gaps 42, 48 as well as the pair of second indexing gaps 44. As such, when the first indexing member 32 is attached to the left portion of the support member 20 or the left side of the deck 14, the first indexing gap 42 and one of the second indexing gaps 44 provide the operative and stored positions of the handle 22. Additionally, when the first indexing member 32 is attached to the right portion of the support member 20 or the right side of the deck 14, the first indexing gap 42 and the other of the second indexing gaps 44 provide the operative and stored positions of the handle 22. It should be understood by one having ordinary skill in the art that at least one second indexing gap 44 is only provided in embodiments in which the handle adjustment assembly 10 provides a stored operative position for the handle 22. It should also be understood by one having ordinary skill in the art that the first indexing member 32 can include any number of indexing gaps to provide multiple operative positions or multiple operative positions and a stored position of the handle 22 relative to the deck 14.

The first indexing member 32 needs only a first indexing gap 42 to provide multiple operating positions (P1-P3) of the handle 22 when attached to the left portion of the support member 20 or left side of the deck 14, and the first indexing member 32 needs only a fourth indexing gap 48 to provide multiple operating positions (P1-P3) of the handle when attached to the right portion of the support member 20 or the right side of the deck 14. The first indexing member 32 further needs only one of the second indexing gaps 44 to provide a stored position of the handle 22. It should be understood by one having ordinary skill in the art that the embodiment of the first indexing member 32 shown in FIGS. 6A-6B include the first indexing gap 48 as well as two second indexing gaps 44, wherein the pair of second indexing gaps 44 allows the first indexing member 32 to be attached to both lateral sides of the support member 20 or the deck 14 which reduces the number of different parts/part numbers that need to be manufactured. It should also be understood by one having ordinary skill in the art that separate designs of the first indexing member 32 can be used to be attached to each opposing side of the support member 20 or the deck 14.

Figure 7A:
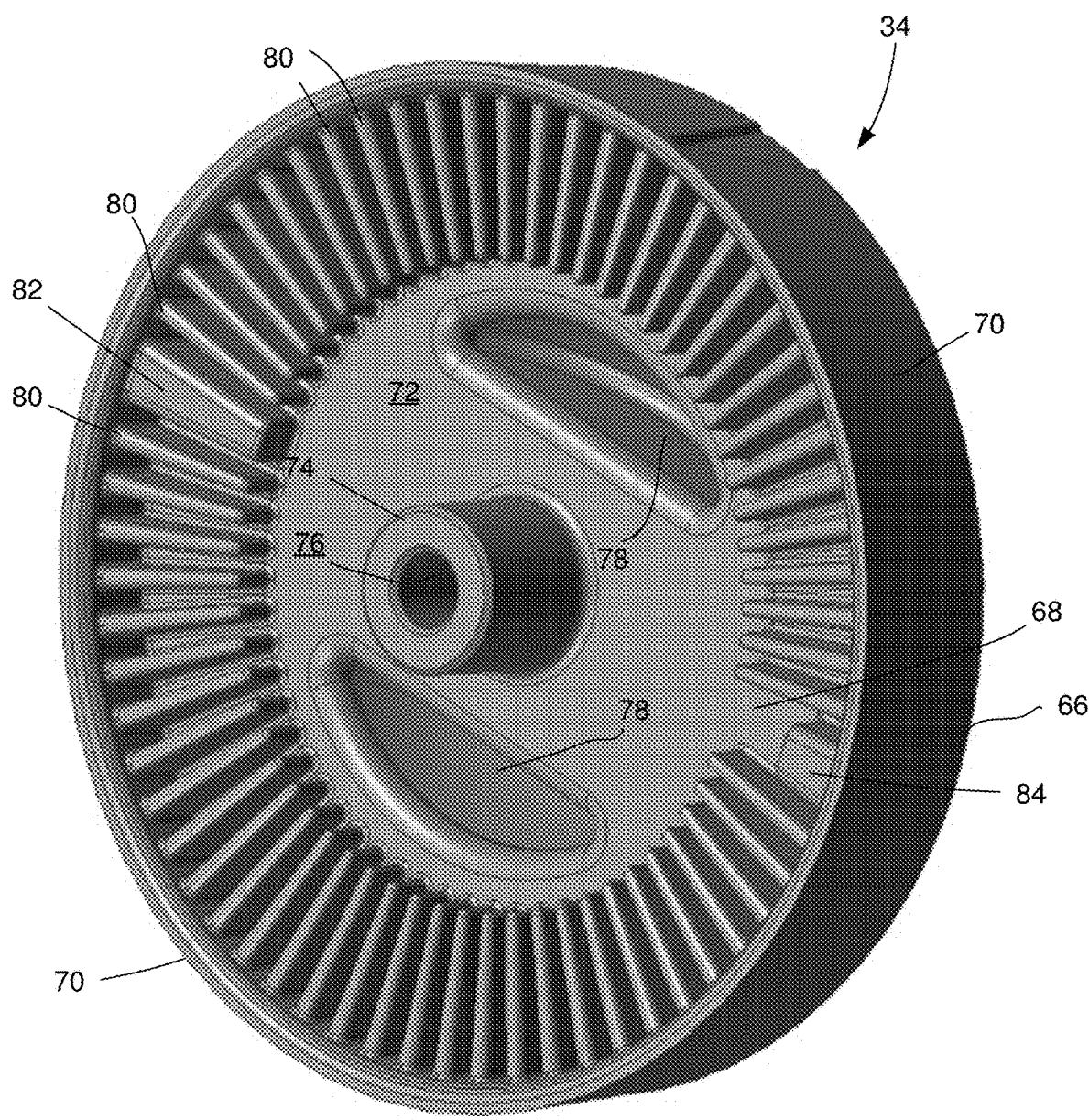
FIG. 7A is an isometric view of a second indexing member.
Figure 7B:
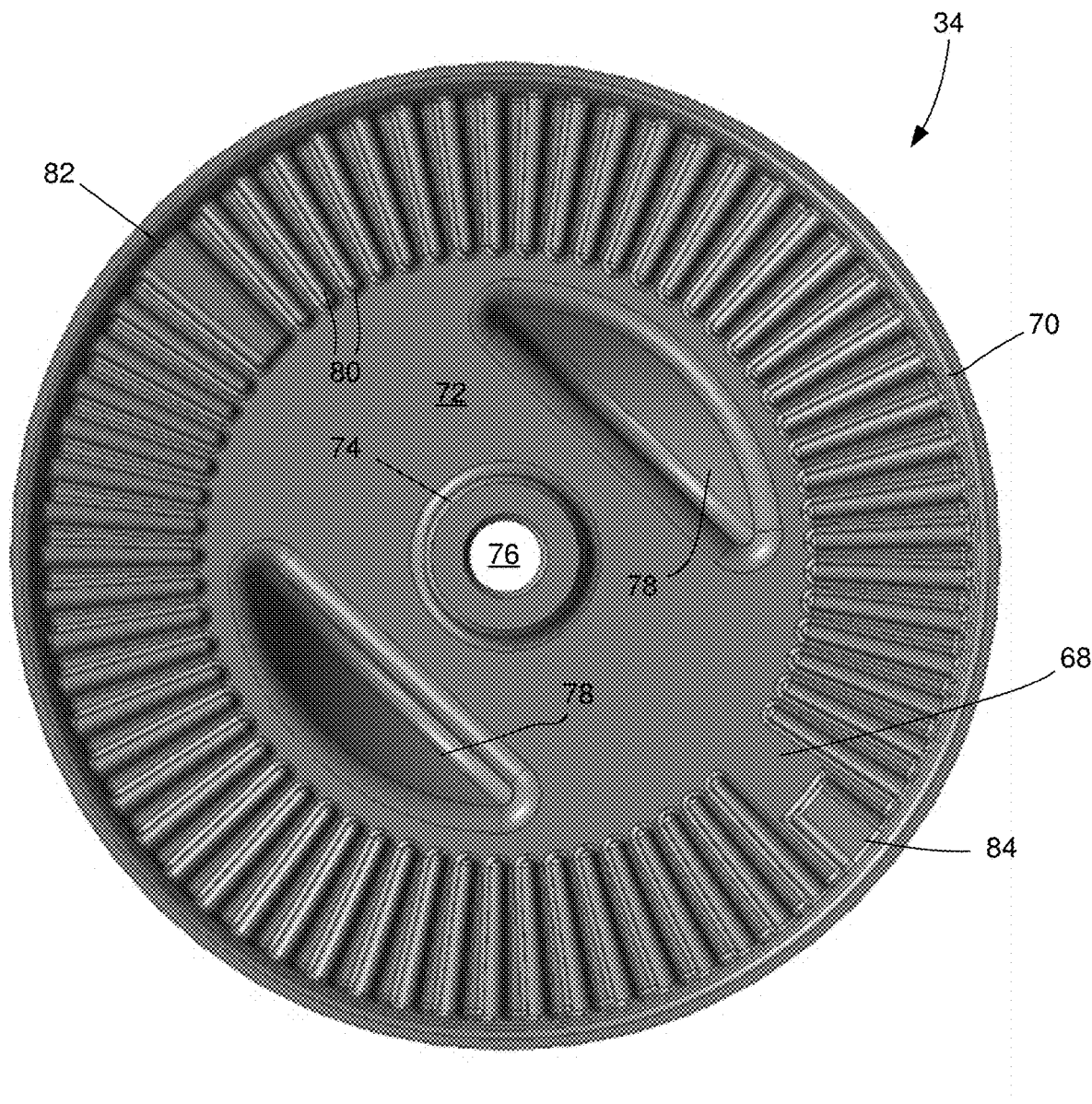
FIG. 7B is a front view of the second indexing member shown in FIG. 7A.

In the exemplary embodiment shown in FIGS. 7A-7B, the second indexing member 34 of the handle adjustment assembly 10 is a generally circular or disk-shaped member. The second indexing member 34 includes a mounting surface 66 and an opposing engaging surface 68. The mounting surface 66 of the second indexing member 34 is configured to receive an end 27 of the handle 22. The engaging surface 68 of the second indexing member 34 is directed toward the engaging surface 40 of the first indexing member 32, and the mounting surface 66 of the second indexing member 34 is directed away from the deck 14. The clasp assembly 36 causes the second indexing member 34 to be selectively engaged with the first indexing member 32.

In the illustrated embodiment, the second indexing member 34 includes a circular ridge 70 that extends axially away from the engaging surface 68, as shown in FIGS. 7A-7B. The ridge 70 is oriented substantially coplanar with, and forms a portion of, the outer circumferential edge of the second indexing member 34. The second indexing member 34 further includes a hub 72, a boss 74 defining a central bore 76, and a pair of positioning members 78. The hub 72 is centrally located and is formed as a generally flat central portion of the second indexing member 34. The hub 72 forms the center of the second indexing member 34. The boss 74 is a cylindrical member that extends axially away from the engaging surface 68 of the hub 72. The central bore 76 is formed through the center of the boss 74, thereby forming an aperture or hole through the center of the second indexing member 34. The boss 74 is configured to be received within the central aperture 56 of the first indexing member 32 so as to axially align the first and second indexing members 32, 34. The central bore 76 receives a clasp assembly 36 for selectively attaching the second indexing member 34 to the first indexing member 32. The positioning members 78 extend axially away from the mounting surface 66. The positioning members 78 are configured to securing the sides of the flattened end 27 of the handle 22 to prevent the handle 22 from rotating relative to the second indexing member 34. The end 27 of the handle 22 is attached to the second indexing member 34 such that rotation of the second indexing member 34 relative to the first indexing member 34 and the deck 14 causes the handle 22 to also rotate in the same manner.

In an embodiment, the second indexing member 34 further includes a plurality of teeth 80 extending about the outer portion of the engaging surface 68, as shown in FIGS. 7A-7B. Similar to the teeth 50 of the first indexing member 32, the teeth 80 of the second indexing member 34 are annularly positioned adjacent to the outer edge of the engaging surface 68. The teeth 80 extend radially inward from the ridge 70 toward the central bore 76. The teeth 80 of the second indexing member 34 are spaced apart the same distance as the teeth 50 of the first indexing member 32, thereby allowing the teeth 50, 80 to be in meshing engagement when the first and second indexing members 32, 34 are in an engaged position. In some embodiments, each of the teeth 80 extend radially inward the same distance from the ridge 70. In other embodiments, at least one of the teeth 80 extends radially inward a different distance from the ridge 58 than the other teeth 80.

In an embodiment, the second indexing member 34 also includes an indexing lug 82 positioned between adjacent teeth 80, as shown in FIGS. 7A-7B. The indexing lug 82 has a generally truncated wedge shape, wherein the indexing lug 82 is formed as a tooth having a larger width than adjacent teeth 80. In some embodiments, the indexing lug 82 extends radially inward from the ridge 70 the same distance as adjacent teeth 80. In an embodiment, the indexing lug 82 has a width that is equivalent to two adjacent teeth connected together without the gap therebetween. Because the indexing lug 82 has the width of at least two adjacent teeth connected together (without the typical gap between adjacent teeth), the indexing lug 82 can only be located within the first or fourth indexing gap 42, 48 or within the second indexing gaps 44. As such, the first, second, and fourth indexing gaps 42, 44, 48 are oriented at the circumferential positions to allow the handle 22 to be located in the operative positions (P1-P3) or the stored position (P4). It should be understood by one having ordinary skill in the art that the indexing lug 82 can alternatively have the width of three or more adjacent teeth connected together. In the illustrated embodiment, the second indexing member 34 also includes a secondary lug 84 configured to absorb or otherwise offset the amount of rotational stresses on the indexing lug 82 as a result of typical pushing, pulling, and other stresses imparted to the handle 22 by an operator during operation of the mower 12. In some embodiments, the secondary lug 84 has the same width as the indexing lug 82. In the illustrated embodiment, the secondary lug 84 extends radially inward from the ridge 70 a smaller distance than the distance that the indexing lug 82 extends radially inward from the ridge 70. In some embodiments, the secondary lug 84 is positioned opposite—or 180°—to the indexing lug 82. In other embodiments, the secondary lug 84 is positioned at a non-opposing position relative to the indexing lug 82.

Figure 8:
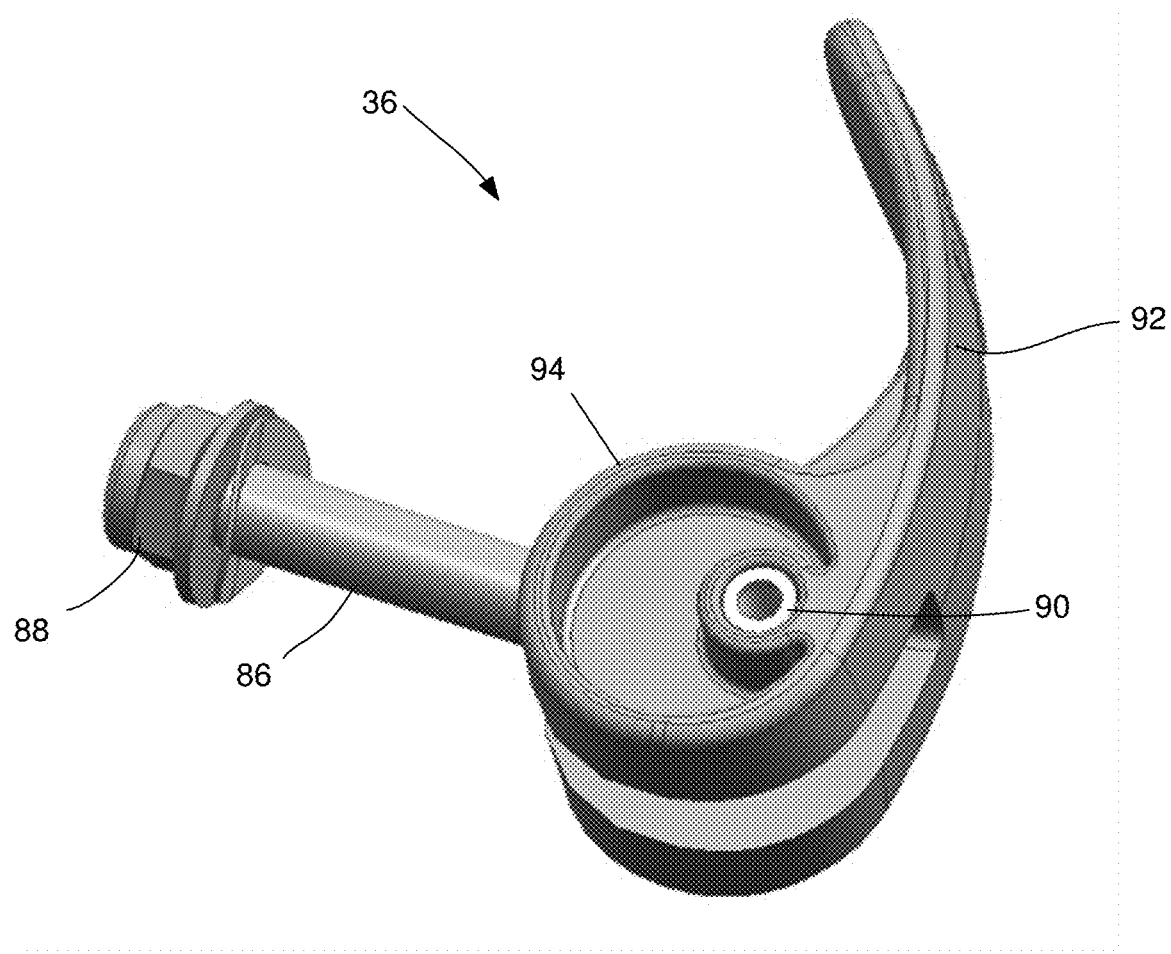
FIG. 8 is an embodiment of a clasp assembly.

The clasp assembly 36 of the indexing mechanism 24 selectively moves the second indexing member 34 between an engaged position and a disengaged position relative with respect to the first indexing member 32. In the embodiment illustrated in FIGS. 5 and 8, the clasp assembly 36 is formed as an over-center mechanism, which is a quick-release mechanism that allows for an adjustment of the indexing mechanism 24 without disassembling the mechanism to adjust the position of the handle 22. The clasp assembly 36 includes a threaded bolt 86, a nut 88, a pin 90, and a lever 92. The threaded bolt 82 is an elongated member that extends through a hole formed in the end of the handle 22, the central bore 76 of the second indexing member 34, the central aperture 56 of the first indexing member 32, and a mounting aperture formed into the support member 20 or the deck 14. The end of the threaded bolt 82 opposite the threaded end includes an aperture formed therethrough for receiving the pin 90. The nut 88 is threaded onto the end of the threaded bolt 82. The pin 90 extends through the end of the threaded bolt 82 and through an aperture of the lever 92 for securing the lever 92 to the threaded bolt 82. The pin 90 provides for a rotatable connection between the lever 92 relative to the threaded bolt 82. The lever 92 includes a cam surface 94 that contacts the end of the handle 22. The first and second indexing members 32, 34 are positioned between the nut 88 and the lever 92.

Rotation of the lever 92 from an engaged position to a disengaged position results in the cam surface 94 causing the second indexing member 34 to separate from the first indexing member 32 as a result of the lateral bias generated by the legs 25 of the handle 22 discussed above. As the second indexing member 34 separates from the first indexing member 32, the teeth 50 of the first indexing member 32 disengage from the teeth 80 of the second indexing member 34, thereby allowing the second indexing member 34 to rotate relative to the first indexing member 34. Similarly, rotation of the lever 92 from the disengaged position to the engaged position results in the cam surface 94 causing the second indexing member 34 to move toward the first indexing member 34 so as to overcome the biasing force of the legs 25 of the handle 22. As long as the indexing lug 82 of the second indexing member 34 is aligned with the first indexing gap 42 or fourth indexing gap 48, the second indexing member 34 is moved into positive, meshing engagement with the second indexing member 34.

The handle 22 is shaped such that the end of the first member 28 is biased laterally outward away from the deck 14 such that when the lever 92 is rotated to the unlocked position, the first member 28 biases the second indexing member 34 away from the first indexing member, thereby causing the second indexing member 34 to disengage from the first indexing member. As such, the clasp assembly 36 does not require an additional spring to bias the second indexing member 34 away from the first indexing member 32. However, it should be understood by one having ordinary skill in the art that the clasp assembly 36 can include a spring positioned between the first and second indexing members 32, 34 that biases the second indexing member 34 away from the first indexing member 32 when the lever 92 rotated to the unlocked position.

Figure 9A:
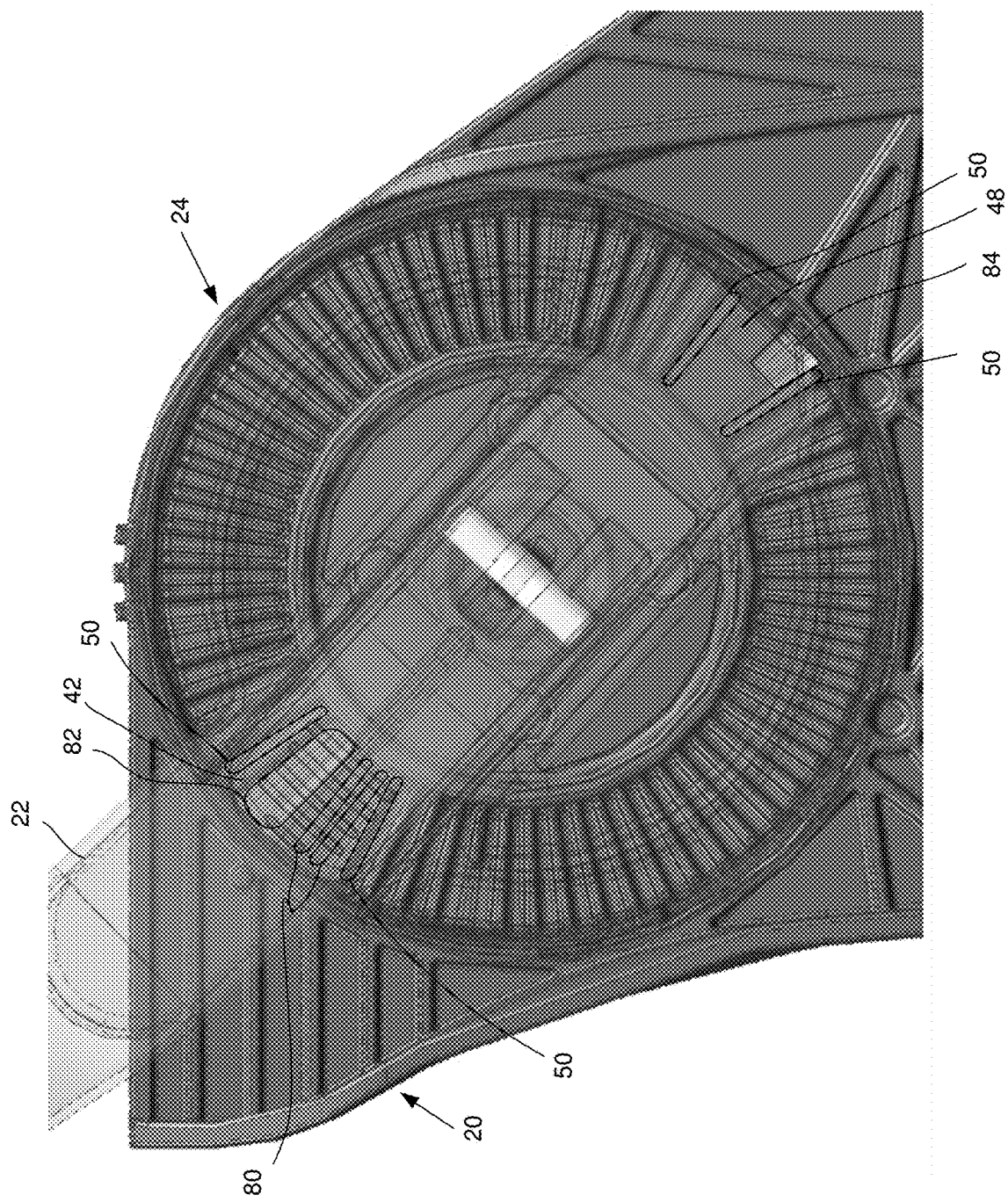
FIG. 9A is a magnified view of an indexing mechanism in a first operative position.
Figure 9B:
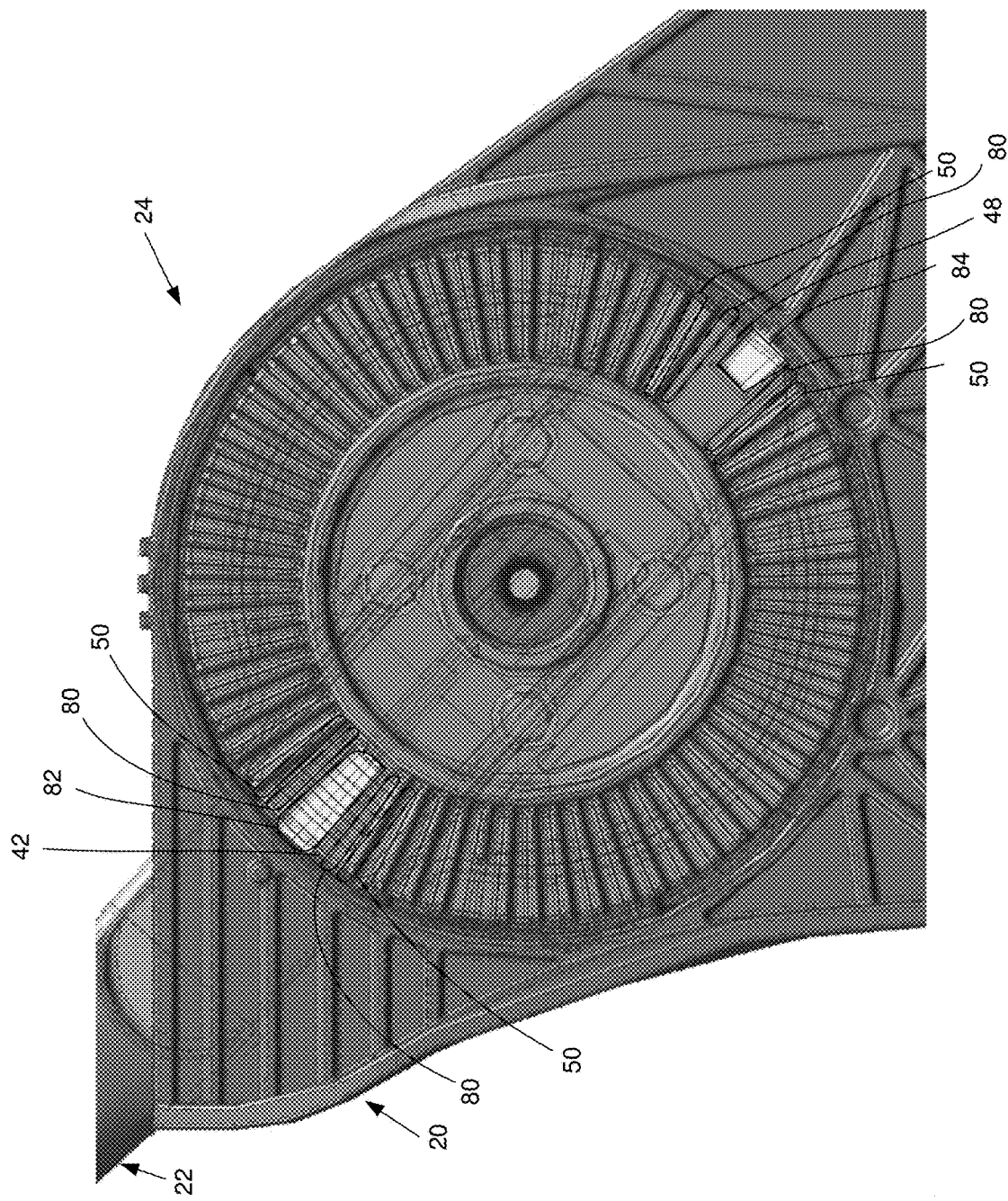
FIG. 9B is a magnified view of an indexing mechanism in a second operative position.
Figure 9C:
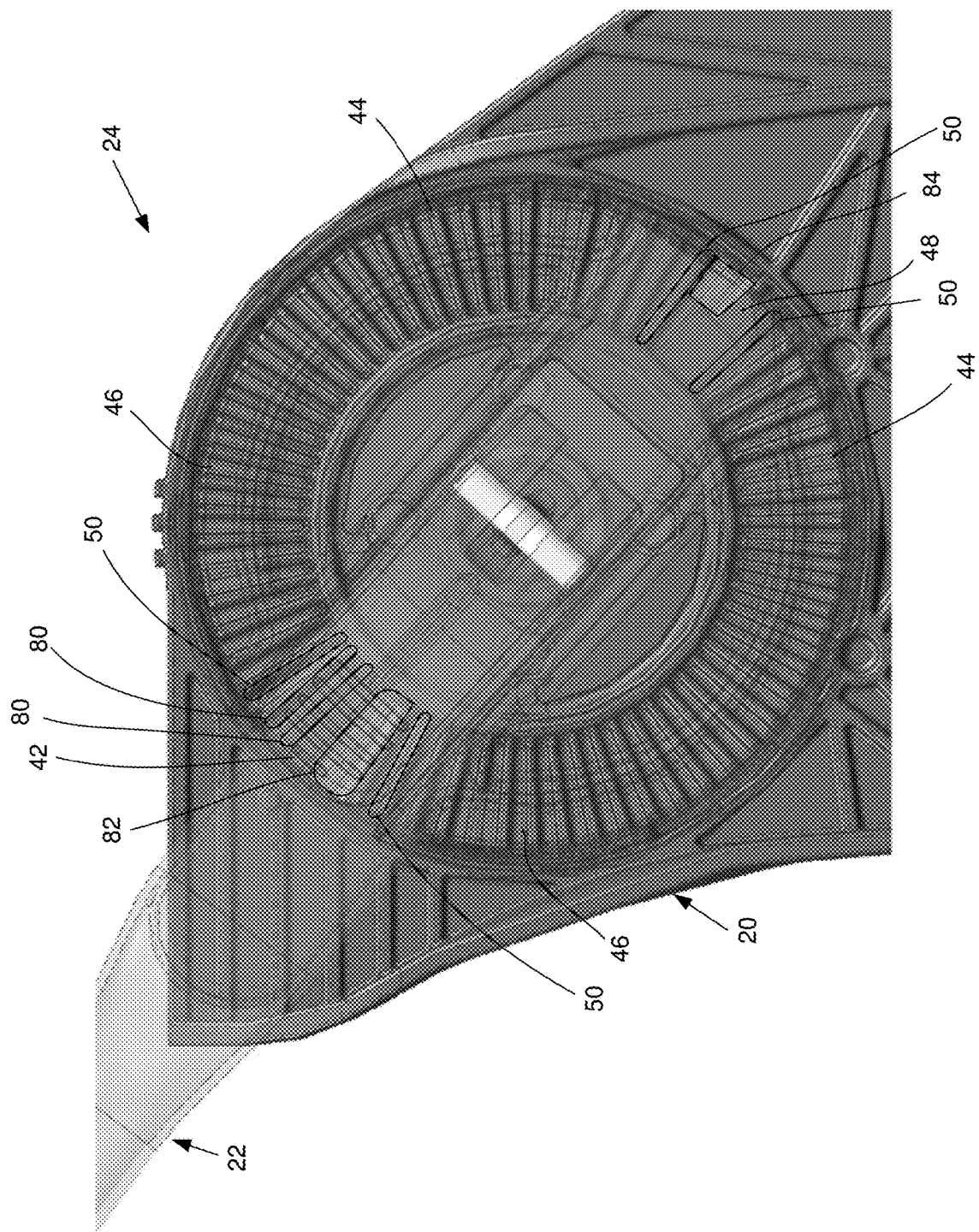
FIG. 9C is a magnified view of an indexing mechanism in a third operative position.
Figure 9D:
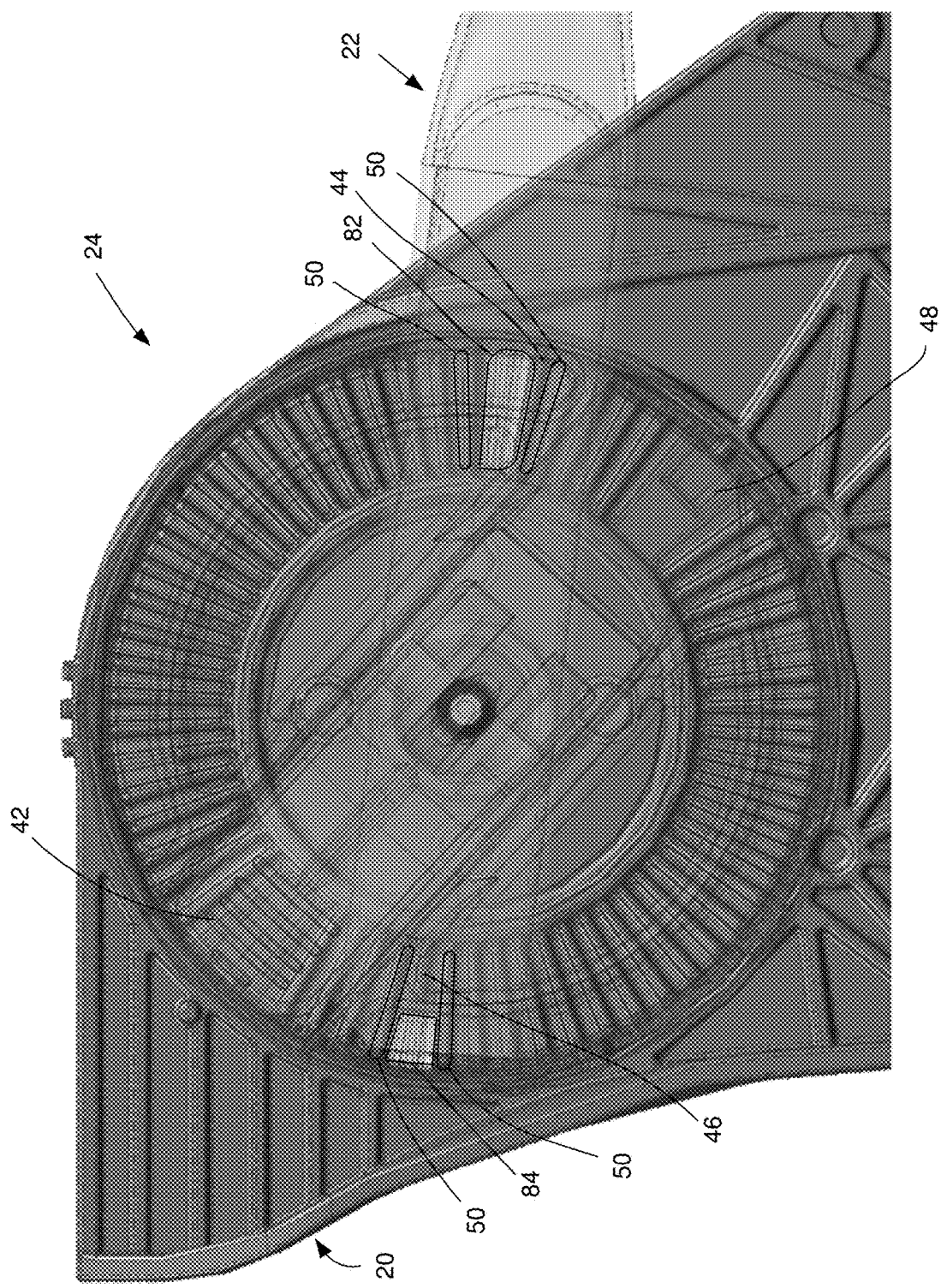
FIG. 9D is a magnified view of an indexing mechanism in a stored position.

FIGS. 9A-9C illustrate the handle 22 and the indexing mechanism 24 connected to the right portion of the support member 20 being positioned in the three operative positions (P1-P3), and FIG. 9D illustrates the handle 22 and the indexing mechanism 24 being positioned in the stored position (P4).

As shown in FIG. 9A, the indexing lug 82 is positioned immediately adjacent to the clockwise tooth 50 bordering the first indexing gap 42. The indexing lug 82 and the two teeth 80 in the counter-clockwise direction (with respect to the view shown in FIG. 9A) of the indexing lug 82 are positioned within the first indexing gap 42. The secondary lug 84 is positioned within the fourth indexing gap 48 immediately adjacent to the clockwise tooth 50 bordering the fourth indexing gap 48. FIG. 9A illustrates the handle 22 and the indexing mechanism 24 oriented in the first operative position P1 (FIG. 1).

As shown in FIG. 9B, the indexing lug 82 is positioned centrally—or at the middle position—within first indexing gap 42, wherein the indexing lug 82 is spaced apart from the clockwise and counter-clockwise teeth 50 bordering the first indexing gap 42. The indexing lug 82, the adjacent tooth 80 in the clockwise direction and the adjacent tooth 80 in the counter-clockwise direction are positioned within the first indexing gap 42. The secondary lug 84 is positioned centrally—or at the middle position—within the fourth indexing gap 48. FIG. 9B illustrates the handle 22 and the indexing mechanism 24 in the second operative position P2 (FIG. 1).

As shown in FIG. 9C, the indexing lug 82 is positioned immediately adjacent to the counter-clockwise tooth 50 bordering the first indexing gap 42. The indexing lug 82 and the two teeth 50 in the clockwise direction (with respect to the view shown in FIG. 9A) of the indexing lug 82 are positioned within the first indexing gap 42. The secondary lug 84 is positioned within the fourth indexing gap 48 immediately adjacent to the counter-clockwise tooth 50 bordering the fourth indexing gap 48. FIG. 9C illustrates the handle 22 and the indexing mechanism 24 oriented in the third operative position P3 (FIG. 1).

As shown in FIG. 9D, the indexing lug 82 is positioned within the second indexing gap 44 that is located counter-clockwise relative to the fourth indexing gap 48. The secondary lug 84 is positioned within the third indexing gap 46 located counter-clockwise relative to the first indexing gap 42. FIG. 9D illustrates the handle 22 and the indexing mechanism 242 oriented in the stored position P4 (FIG. 1).

In the illustrated embodiment, the size or width of the first indexing gap 44 of the first indexing member 32 to provide three operative positions (P1-P3) of the handle 22 is the width of four missing teeth 50, wherein the indexing lug 82 is the width of two teeth 80 of the second indexing member 34. In another embodiment, the size or width of the first indexing gap 44 of the first indexing member 32 to provide four operative positions (P1-P3) of the handle 22 is the width of five missing teeth 50, wherein the indexing lug 82 is the width of two teeth 80 of the second indexing member 34. It should be understood by one skilled in the art, in view of FIGS. 9A-9C, that the width of the first indexing gap 44 has a width that is two (+2) teeth 50 more than the number of operative positions provided by the first indexing member 32.

In operation, to adjust the orientation of the handle 22, the operator adjusts the operative position of both of the indexing mechanisms 24 of the handle adjustment assembly 10 simultaneously. This is done by unlocking both of the indexing mechanisms 24 before adjusting the handle 22 to the desired operative or stored position. Once the handle 22 is moved to the desired orientation, both of the indexing mechanisms 24 are then locked to finish the adjustment of the handle 22. The first step in adjusting the handle 22 and the handle adjustment assembly 12 is to raise or lift the lever 92 of the clasp assembly 36 of both of the indexing mechanisms 24. Lifting the levers 92 causes the second indexing member 34 of each of the indexing mechanisms 24 to move to an unlocked position in which the first second indexing member 34 is disengaged from meshing engagement with the first indexing member 32. Once both of the indexing mechanisms 24 are in the unlocked position, the next step is to rotate the handle 22 to one of the operative positions (P1-P3) or the stored position (P4) relative to the deck 14. After the handle 22 has been rotated to the desired operative or stored position, the final step is to push the levers 92 of both of the indexing mechanisms 24 which causes the second indexing member 34 to move to the locked position such that the second indexing members 34 are in meshing engagement with the corresponding first indexing member 32. When adjusting the orientation of the handle 22, if the handle 22 is rotated to a location in which the indexing lug 82 is out of alignment with the first or fourth indexing gaps 42, 48, the second indexing member 34 is unable to be moved into engagement with the corresponding first indexing member 32.

It should be understood by one having ordinary skill in the art that the operator can also adjust the handle 22 by adjusting the operative position of each of the indexing mechanisms 24 of the handle adjustment assembly 10 separately.

It should also be understood by one having skill in the art that the first and second indexing members 32, 34 of the indexing mechanism 24 can be reversed such that the indexing member attached to the support member 20 or deck 14 includes an indexing lug 82 and the corresponding indexing member includes a first indexing gap 42.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

The invention claimed is:

1. A handle adjustment assembly of a walk-behind lawn mower for selectively adjusting an orientation of a handle of said mower, said mower having a deck, a plurality of ground engaging members connected to said deck, and a power supply connected to said deck for driving a cutting system, said handle adjustment assembly comprising:
   a pair of indexing mechanisms, wherein each of said indexing mechanisms comprises:
   a first indexing member attached to said deck or to a support member connected to said deck, said first indexing member having a plurality of annularly positioned first teeth, and a first indexing gap located within said plurality of first teeth of said first indexing member;
   a second indexing member selectively engageable with said first indexing member, said second indexing member having a plurality of annularly positioned second teeth, and a first indexing lug located within said plurality of second teeth of said second indexing member; and
   a clasp assembly connected to said first and second indexing members, wherein said clasp assembly is actuatable between a locked position and an unlocked position; and
   a handle having a pair of opposing legs connected by a cross-bar, each of said legs having an end, and each end being attached to one of said indexing members of said adjustable handle assembly;
   wherein said clasp assembly of each indexing mechanism is actuatable between a locked position in which said second indexing member is engaged with said first indexing member wherein said first indexing lug is located within said first indexing gap and said first teeth being in meshing engagement with said second teeth and an unlocked position in which said second indexing member is disengage from said first indexing member;
   wherein said second indexing member is rotatable relative to said first indexing member to selectively adjust said first indexing lug to one of a plurality of operative positions provided by said first indexing member, and said height of said handle relative to said ground is adjusted in response to said first indexing members being rotatably adjusted relative to said second indexing members to provide a plurality of operative positions of said handle;
   wherein the indexing mechanisms are each independently adjustable between the locked position of each and the unlocked position of each; and
   wherein the first indexing member is dissimilar from the second indexing member.

2. The handle adjustment assembly of claim 1, wherein said support member is attached to a rear end of said deck, said support member having a pair of feet that contact the ground for stabilizing said mower when said mower is oriented in a vertical orientation.

* * * * *